US012696898B2

(12) United States Patent
    Knoles

(10) Patent No.:  US 12,696,898 B2
(45) Date of Patent:      Aug. 4, 2026

(54) COMPOSITION AND METHOD OF INDUCING SYSTEMIC ACQUIRED RESISTANCE (SAR) IN PLANTS

(71) Applicant: Kavach Inc., Sebastopol, CA (US)

(72) Inventor: Krishan Knoles, Calpella, CA (US)

(73) Assignee: Kavach Inc., Sebastopol, CA (US)

( * ) Notice:      Subject to any disclaimer, the term of this patent is extended or adjusted under 35 U.S.C. 154(b) by 0 days.

(21) Appl. No.:      18/725,024

(22) PCT Filed:      Jan. 11, 2024

(86) PCT No.:      PCT/US2024/011299
     § 371 (c)(1),
     (2) Date:      Jun. 27, 2024

(87) PCT Pub. No.: WO2024/151884
     PCT Pub. Date: Jul. 18, 2024

(65) Prior Publication Data
     US 2025/0351823 A1      Nov. 20, 2025

Related U.S. Application Data

(60) Provisional application No. 63/511,498, filed on Jun. 30, 2023, provisional application No. 63/443,622, filed on Feb. 6, 2023, provisional application No. 63/479,598, filed on Jan. 12, 2023.

(51) Int. Cl.
     *A01N 37/14*      (2006.01)
     *A01P 21/00*      (2006.01)
(52) U.S. Cl.
     CPC .............. *A01N 37/14* (2013.01); *A01P 21/00* (2021.08)
(58) Field of Classification Search
     CPC .................................................... A01N 37/14
     See application file for complete search history.

(56) References Cited

U.S. PATENT DOCUMENTS

| | | | | |
|---|---|---|---|---|
| 6,582,961 | B1 * | 6/2003 | Moon ..................... | A01N 59/00 514/159 |
| 8,137,429 | B2 * | 3/2012 | Marks ..................... | C05F 11/10 71/27 |
| 2008/0032893 | A1 | 2/2008 | Marks | |
| 2009/0038355 | A1 | 2/2009 | Marks | |
| 2010/0317519 | A1 | 12/2010 | Filppini et al. | |

OTHER PUBLICATIONS

White et al. "Acetylsalicylic acid (aspirin) induces resistance to tobacco mosaic virus in tobacco", 99 Virology (1979) 410-412.*
Achuo et al. "The salicylic acid-dependent defence pathway is effective against different pathogens in tomato and tobacco," Plant Pathology, 2004, 53, pp. 65-72.

Brodersen et al. "The Role of Salicylic Acid in the Induction of Cell Death in *Arabidopsis* acd11," Plant Physiology, Jun. 2005, 138, pp. 1037-1045.
Chivasa et al. "Salcylic Acid Interferes with Tobacco Mosaic Virus Replication via a Novel Salicylhydroxamic Acid-Sensitive Mechanism," The Plant Cell, Apr. 1997, American Society of Plant Physiologists, p, pp. 547-557.
Choi et al. "Activation of Plant Innate Immunity by Extracellular High Mobility Group Box 3 and its Inhibition by Salicylic Acid," PLOS Pathogens, Mar. 23, 2016, 12(3):e1005518, pp. 1-21.
Conrath et al. "Priming: Getting Ready for Battle," Molecular Plant-Microbe Interactions, 2006, 19(10):1062-1071.
Conrath et al. "Priming for Enhanced Defense," Annual Review of Phytopatology, 2015, 53, pp. 97-119.
Dempsey et al. "How does the multifaceted plant hormone salicylic acid combat disease in plants and are similar mechanisms utilized in humans," BioMed Central Biology, 2017, 15:23, pp. 1-11.
Elsabagh et al. "Effect of Some Pre-Harvest Treatments on Quality of Fruit of Amal Apricot Cultivar," New York Science Journal, Oct. 2020, 13(7):16-24.
Enyedi et al. "Localization, conjugation, and function of salicylic acid in tobacco during the hypersensitive reaction to tobacco mosaic virus," Proceedings of the National Academy of Sciences, USA, Plant Biology, Mar. 1992, 89, pp. 2480-2484.
Gaffney et al. "Requirement of Salicylic Acid for the Induction of Systemic Acquired Resistance," Science, New Series, Aug. 6, 1993, 261(5122):754-756.
Gondor et al. "The role of methyl salicylate in plant growth under stress conditions," Journal of Plant Physiology, 2022, 227, 153809, pp. 1-13.
Hassoon et al. "Review on the Role of Salicylic Acid in Plants," Sustainable Crop Production, Intech Open, 2019. pp. 1-6.
Hayat et al. "Effect of exogenous salicylic acid under change environment: A review," Environmental and Experimental Botany, 2010, 68, pp. 14-25.
Koo et al. "Salicylic Acid as a Safe Plant Protector and Growth Regulator," Plant Pathology Journal, 2020, 36(1):1-10.
Loake et al. "Salicylic acid in plant defence—the players and protagonists," Current Opinion in Plant Biology, 2007, 10, pp. 466-472.
Liu et al. "The Extent to Which Methyl Salicylate is Required for Signaling Systemic Acquired Resistance is Dependent on Exposure to Light after Infection," Plant Physiology, Dec. 2011, 157, pp. 2216-2226.

(Continued)

*Primary Examiner* — Gina C Justice
(74) *Attorney, Agent, or Firm* — Perkins Coie

(57)      ABSTRACT

Disclosed is a composition or formulation and methods for inducing Systemic Acquired Resistance (SAR) in plants, optimizing plant health, increasing yields, improving crop quality, and resisting pathogens and pests, and suppress plant virus. Also disclosed are a method of initiating and inducing a superior SAR response by application of and method of treatment with a formulation of salicylate molecules. Further disclosed is a method of preventing viral infections, suppressing plant virus in infected plants, returning plants to an outwardly healthy state, and achieving a successful harvest.

20 Claims, 1 Drawing Sheet

(56)                References Cited

OTHER PUBLICATIONS

Liu et al. "Salicylic acid signalling: new insights and prospects at a quarter-century milestone," 2015, Essays Biochemistry, 51, pp. 101-113.
Mauch-Mani, "Defense Priming: An Adaptive Part of Induced Resistance," Annual Review of Plant Biology, 2017, 68, pp. 485-512.
Murphy et al. "Salicylic Acid Has Cell-Specific Effects on Tobacco mosaic virus Replication and Cell-to-Cell Movement," Plant Physiology, Feb. 2002, 128, pp. 552-563.
Naylor et al. "Salicylic Acid Can Induce Resistance to Plant Virus Movement," Molecular Plant-Microbe Interactions, 1998, 11(9):860-868.
Park et al. "Methyl Salicylate Is a Critical Mobile Signal for Plant Systemic Acquired Resistane," Science, 2007, 318, pp. 113-116.
Pastor et al. "Primed plants do not forget," Environmental and Experimental Botany, Science Direct, Oct. 2013, 94, pp. 46-56.
Pfleger et al. "Fact Sheet: Tomato—Tobacco Mosaic Virus Disease," Agricultural Extension Service, University of Minnesota, Plan Pathology, 1975, 27.
Popova et al. "Salicylic Acid: Properties, Biosynthesis and Physiological Role," Bulgarian Journal of Plant Physiology, 1997, 23(1-2):85-93.s.

Sarinana-Aldaco et al. Foliar Aspersion of Salicylic Acid Improves Nutraceutical Quality and Fruit Yield in Tomato, Agriculture, 2020, 10(482):1-10.
Shulaev et al. "Airborne signalling by methyl salicylate in plant pathogen resistance," abstract only, Nature, Feb. 20, 1997, 385, pp. 718-721.
Singh et al. "Activation of multiple antiviral defence mechanisms by salicylic acid," Molecular Plant Pathology, 2004, 5(1):57-63.
Van Huijsduijnen et al. "Induction by Slicylic Acid of Pathogenesis-related Proteins and Resistance to Alfalfa Mosaic Virus Infection in Various Plant Species," Journal of General Virology, 1986, 67 pp. 2135-2143.
Zheng et al. "Systemic acquired resistance: turning local infection into global defense," abstract only, Annual Review of Plant Biology, Jan. 25, 2013, 64, pp. 839-863.
International Search Report and Written Opinion from PCT Application No. PCT/US2024/011299 mailed May 10, 2024.
Garcia-Pastor et al. "Preharvest application of methyl salicylate, acetyl salicylic acid and salcylic acid alleviated disease caused by Botrytis cinerea through stimulation of antioxidant system in table grapes," International Journal of Food Microbiology, 2020, 334, 108807.
Gupta et al., "Tobamovirus infection aggravates gray mold disease caused by Botrytis cinerea by manipulating the salicylic acid pathway in tomato," Front. Plant Sci. 14:1196456, doi:10.3389/fpls.2023.1196456, 13 pages.

* cited by examiner

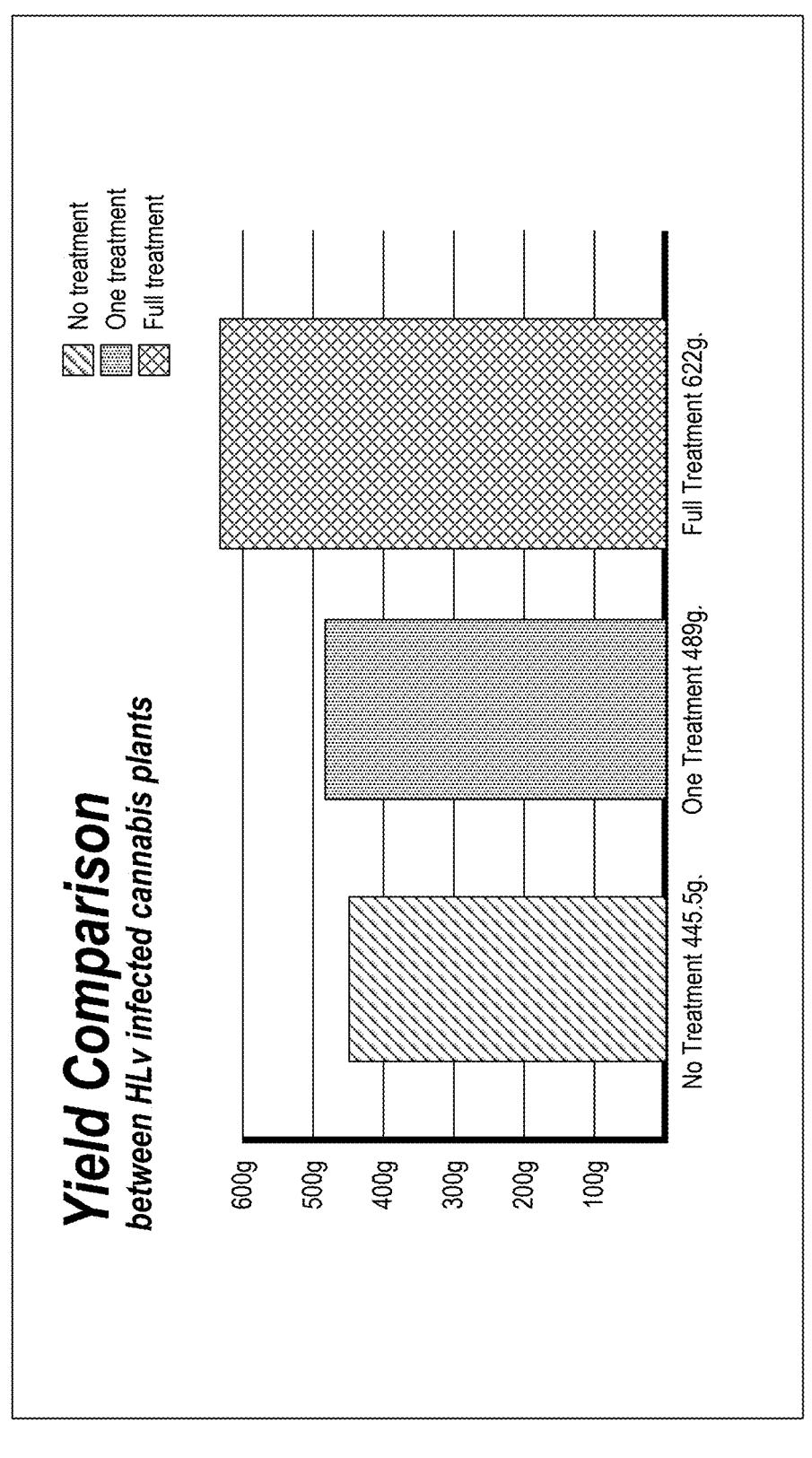

COMPOSITION AND METHOD OF INDUCING SYSTEMIC ACQUIRED RESISTANCE (SAR) IN PLANTS

CROSS REFERENCE TO RELATED APPLICATIONS

This patent document is a 371 National Stage Application of International Patent Application No. PCT/US2024/011299, filed on Jan. 11, 2024, which claims priority to the provisional applications with Ser. Nos. 63/479,598 filed Jan. 12, 2023, 63/443,622 filed Feb. 6, 2023 and 63/511,498 filed Jun. 30, 2023. The entire contents of the above noted applications are incorporated by reference as part of the disclosure of this document.

TECHNICAL FIELD

The present disclosure relates to composition or formulation and methods for initiating and inducing Systemic Acquired Resistance (SAR) in plants, and preventing, treating, and suppressing plant virus and/or viroid.

BACKGROUND

As climate change becomes more prominent, successfully growing and harvesting plants for food consumption and medicinal value is becoming more challenging. Known plant disease and emerging plant diseases have become more frequent and in coming decades it is expected that shifts in the geographic distributions of pests and pathogens in response to climate change and increased global commerce demand will make them both more frequent and severe, putting food security in jeopardy.

The Earth's projected human population in 2050 is close to 10 billion. The United Nations Food and Agriculture Organization projects that we need to increase food production by at least 70% to accommodate this surge in population growth. This is a daunting task, made even more difficult by the fact that nearly 20% of the global harvest is lost to plant diseases.

One of the most efficient ways to combat these diseases is through chemical control—the application of pesticides. However, pathogens can quickly develop resistance to pesticides, which can then require ever higher usage to maintain production. There are also environmental and health concerns associated with the application of potentially toxic chemicals to fields. Known commercial means of treating pathogens in plants often require toxic substances that are very costly, not only monetarily but health wise for the human population.

Plants have evolved highly effective mechanisms for resistance to disease caused by infectious agents, such as bacteria, fungi and viruses, viroids as well as abiotic stress like wounds, drought and heat. Some of the plant responses to the biotic and abiotic stresses are limited to a localized area of stress or damage. Other responses systemically spread far from the localized area to the whole plant. This includes induced resistance, which is a physiological state of enhanced defensive capacity of the plant triggered by biological or chemical inducers, which protects plant tissues that have not been exposed to the initial attack against future attack by pathogens. These responses include Systemic Acquired Resistance—SAR. SAR is induced by pathogens and insects and is capable of being artificially induced. SAR is characterized by increased levels of the plant hormone salicylic acid, which activates the expression of a large set of pathogenesis-related genes, involved in defense responses against biotic and abiotic stress.

Pathogens, particularly plant viruses and viroids, are introduced into plants and spread between plants in a variety of ways. Pest vectors, introducing new infected plants into existing crop fields, plant propagation from an infected plant, water transferred between plants, mechanical transfer via workers and even airborne transfer has been known to spread pathogens from plant to plant.

Plants, plant viruses or viroids and their insect vectors exist interrelatedly. As the effects of climate change accelerate, vector insects and the viruses and viroids they transmit will migrate. New insect and virus pressure will be put on areas of agricultural production that previously had not been exposed to them. As these effects accelerate, the potential for novel plant virus epidemics also accelerate. The virulence and frequency of viral outbreaks will also increase, massively impacting global food security. Plant viruses currently account for about $30 billion annual loss in world agriculture, and represent about 50% of emerging plant disease globally. There are currently no effective treatments for plant virus suppression in agriculture.

Therefore, there is an unmet need for a composition or formulation and method of treating plants that activates the SAR response at the beginning of their life cycle, to effectively "turn on" their immune system, giving a host of beneficial effects, such as optimizing plant health, increasing yields, resisting pathogens and pests, suppressing plant virus, and enhancing harvests. Farmers also need a method of suppressing plant viruses in order to achieve successful harvests, especially when otherwise faced with crop loss. This needs to be done in a minimally toxic manner, at low cost to the farmer. This could increase yields in developing countries, severely affected by plant pathogens—particularly plant viruses.

BRIEF DESCRIPTION OF THE DRAWINGS

FIG. 1 shows the yield of virus-infected plants treated with multiple treatment ("full treatment") of a formulation of the present technology, a single treatment ("one treatment") of a formulation of the present technology, or with no treatment.

DETAILED DESCRIPTION

Disclosed herein are compositions or formulations and methods for initiating and inducing Systemic Acquired Resistance (SAR) in plants for preventing, treating, or suppressing plant virus or viroid. As used herein, the term "virus" generally refers to infective agents that are only capable of multiplying within a host cell, which may include viruses, viroids, prions and other infective particles. In the following description, certain specific details are set forth in order to provide a thorough understanding of various embodiments. In some instances, well-known structures have not been shown or described in detail to avoid unnecessarily obscuring descriptions of the embodiments. Unless the context requires otherwise, throughout the specification and claims which follow, the word "comprise" and variations thereof, such as, "comprises" and "comprising" are to be construed in an open, inclusive sense, that is, as "including, but not limited to." Further, headings provided herein are for convenience only and do not interpret the scope or meaning of the claimed disclosure.

Reference throughout this specification to "some embodiments", "one embodiment" or "an embodiment" means a particular feature, structure or characteristic described in connection with the embodiment is included in at least one embodiment. Thus, the appearances of the phrases "in some embodiments", "in one embodiment" or "in an embodiment" in various places throughout this specification are not necessarily all referring to the same embodiment. Furthermore, the particular features, structures, or characteristics may be combined in any suitable manner in one or more embodiments. Also, as used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The word "about" when immediately preceding a numerical value means a range of plus or minus 10% of that value, e.g., "about 50" means 45 to 55, "about 10" means "9 to 11", etc. Furthermore, the phrases "less than about" a value or "greater than about" a value should be understood in view of the definition of the term "about" provided herein.

The activation of SAR via Salicylic Acid (SA) and Acetyl Salicylic Acid (ASA) is well described in the scientific literature. However, sustained, maximal levels of SAR, sufficient to suppress plant virus for the lifecycle of the plant and a methodology to do so are not described. This formulation and methodology induces a more profound and long term SAR response than anything achieved in the scientific literature. The compositions and methods disclosed herein allows a user to suppress plant viruses and achieve harvest.

When used according to the treatment methodology of the present technology, the unique formulation of multiple sources of Salicylates effectively suppresses plant viruses. The methods of the present technology produce both immediate and sustained activation of the SAR response, which allows for the suppression of plant viruses. The present technology also allows the plant to flower or fruit as normal—because the enhanced SAR response has suppressed the otherwise devastating effects of the plant virus.

A composition is provided including various amounts of ingredients and applications that depend upon the goal of treatment. In some embodiments, the treatment strategy uses a Defense Priming approach, to induce SAR early in a plant's life and sustain it for its life cycle duration. In some embodiments, the method may be used to repeatedly treat plants under high pressure of biotic or abiotic disease and/or plants of high crop value. In some embodiments, the technology may be used to suppress a known or suspected plant virus, in order to achieve harvest. In some embodiments, the methods may be used to increase rooting rates in clones that are propagated from treated mother plants. In some embodiments, the method may be used to maintain maximal SAR activation indefinitely. In some embodiments, the method may be used to maintain viral suppression indefinitely. In some embodiments, a combination of these approaches may be taken.

A person of ordinary skill in the art would appreciate that the present defense priming techniques can be applied to any plant. In some embodiments, the present technology relates to defense priming of any flowering plant. In some embodiments, the present technology includes methods of defense priming comprising administering a composition of the present technology before the plant begins its flowering period.

Treating virus infected plants may require a different composition mixture than one used to induce SAR in healthy plants. Treatment frequency and methodology may differ depending on the goal of treatment, and will be generally described here.

As used herein, "applying" the composition to the plant includes both directly applying the composition to the plant and applying the composition to the soil immediately surrounding the plant.

In some embodiments, the composition of the present technology may include Acetyl Salicylic Acid (ASA), which breaks down slowly into Salicylic acid after application. ASA may be applied by foliar spraying, drenched, or directly applying the composition to the soil surface or soil subsurface. The slow breakdown of ASA gives the longer-term effects of consistent SAR activation. In some embodiments, the ASA is applied when there is no rain in the forecast to prevent the composition from being "washed off" by rain or subsequent applications of other different sprays. In some embodiments, the composition remains applied to the plant (for example remains on the leaf surface) for about 4 days, 5 days, 6 days, 7 days, 8 days, 9 days, 10 days, 11 days, or 12 days or longer. In some embodiments, the composition remains applied to the plant for about 5 days or longer. In some embodiments, the composition remains applied to the plant for about 7 days or longer. In some embodiments, the composition remains applied to the plant for about 5 to 9 days.

As used herein, the composition "remains" applied to the plant if the composition is in direct contact with the plant (for example, directly on the leaves) or is in direct contact with the soil immediately surrounding the roots of the plant for a period that is not interrupted by more than 2 days. The soil immediately surrounding the roots includes soil that the roots are in contact with as well as the soil where the roots will eventually grow. The composition no longer remains applied to the plant if it is washed off by artificial forces (e.g. watering) or natural forces (e.g. rain). In some embodiments, the composition is re-applied after the composition is washed off. In embodiments where the composition is re-applied within 1 to 2 days of being washed off, the composition "remains" on the plant for the full period of time. For example, if the composition is applied to a plant on day 0, and it rains on day 1, the composition "remains" applied to the plant if the composition is reapplied by day 2.

In some embodiments, the composition of the present technology includes Salicylic Acid (SA), which provides a short and quick acting, immediate release of Salicylic Acid to begin the SAR response as soon as possible. With the combination of ASA and SA, a constant and effective level of salicylates are present for supporting a continuous SAR response, both quick acting SA and slow acting ASA.

In some embodiments, the composition of the present technology includes Methyl Salicylate (MeSA), which provides a messenger signal response to the plant to immediately activate the SAR response. In some embodiments, the formulation of the present technology uses Methyl Salicylate sourced from natural oil of Wintergreen. With the addition of volatile Methyl Salicylate, all plants treated with this composition will have a messenger signal response to immediately activate SAR. This effect is so powerful that plants nearby that are untreated will also activate SAR at some level. Methyl Salicylate, although similar in chemistry to Salicylic acid, induces SAR via a unique and separate pathway.

The messenger signal response from Methyl Salicylate may be more effective at night, therefore, in some embodiments, foliar treatments that comprise Methyl Salicylate may be done at or after sunset, or in the night. In embodiments where the plants are grown under lights, the foliar treatments may be done when lights are off.

Methyl Salicylate also gives the effect of resistance to chilling, and increased glucose content in harvest. Methyl salicylate attracts beneficial insects to the plant giving an additional beneficial insect attraction, which reduces pest insect populations. In some embodiments, the method may further comprise attracting a beneficial insect to the plant. Beneficial insects may include Coccinellidae—"lady bugs" and Stethorus—"spider mite destroyers."

In one embodiment, a combination of these three ingredients provide superior and enhanced SAR provided by the long-term slow release of Acetyl Salicylic Acid, the quick action of Salicylic Acid and the messenger signal of the volatile Methyl Salicylate. In another embodiment, the combination of these three Salicylate molecules in the formulation provides a superior SAR activation.

In some embodiments, the composition is a dry powder. In some embodiments, the composition is in pellet form. In other embodiments, liquid compositions and concentrated liquid compositions may be used while adjusting units of measure with water, or other liquid solutions.

In some embodiments the formulation/composition can be used as a foliar spray, as a root drench, a plant dip, or as a direct soil surface application. In other embodiments the formulation may also be used as a soil or growing medium preparation prior to or during planting.

In some embodiments, the formulation/composition include organically sourced formulations, using organic sources of Salicylates including but not limited to Willow, Myrtle, Meadowsweet, Licorice and Wintergreen. These include in any combination of extracted, concentrated, purified or synthesized form.

According to some embodiments, Silica or Silicon may be added as an additive to the formulation. This could be in the form of Orthosilicic acid, Monosilicic acid, Potassium Silicate, or another Silicate or Silicon molecule. This strengthens the cell walls of the plant and offers further disease resistance.

In some embodiments the composition/formulation include other molecules that induce priming responses in plants such as but not limited to—β-Aminobutyric acid (BABA), Jasmonic Acid, Azelaic Acid, Pipecolic Acid and other Salicylate molecules.

In some embodiments, the composition/formulation comprises: Acetyl Salicylic Acid—about 80% to about 99%; Salicylic Acid—about 1% to about 10%; and Methyl Salicylate—about 0.01% to about 2% by weight. According to another embodiments, the composition/formulation comprises Acetyl Salicylic Acid—about 80%-85%, 85%-90%, or 90%-95%, or 95%-99% by weight; Salicylic Acid—about 1%-2%, 2%-4%, 4%-6%, 6%-8%, or 8%-10% by weight; and Methyl Salicylate about 0.01%-0.2%, 0.2%-0.4%, 0.4%-0.8%, 0.8%-1.0%, 1.0%-1.2%, 1.2%-1.4%, 1.4%-1.6%, 1.6%-1.8%, or 1.8%-2.0% by weight. In some embodiments, the composition comprises about 95% ASA, about 5% SA, and about 0.1% MeSA. In other embodiments, the formulation comprises any combinations in these ranges disclosed herein.

As used herein, "preventing" plant infection includes preventing the infection of a plant from occurring. For example, a plant that does not have a virus or viral symptoms can be prevented from becoming infected by applying the composition of the present technology. In some embodiments, prevention can be found by observing a virus-free plant or a plant with no viral symptoms that remains virus-free or free of viral symptoms after treatment with the disclosed composition, while control plants that are not treated become infected or acquire viral symptoms.

Observing a virus-free plant can be done using any tool known to one of skill in the art, including visual inspection for signs of viral infection as a well as assays used to detect viral particles, including genetic sequencing technologies. As used herein, a "viral symptom" includes any visual, microscopic, or chemical characteristic that indicates the presence of a viral infection.

As used herein, "treating" plant infection includes administering a composition to an infected plant and causing an elimination or reduction of the virus from the plant or a reduction in viral symptoms. For example, a plant that has a virus may be treated to have fewer or no virus particles or fewer or no viral symptoms compared to before the treatment. Treating plant infection can be found by detecting fewer or no virus particles or fewer or no viral symptoms compared to before the treatment was administered. Treating plant infection can also be found by measuring fewer or no viral particles or fewer or no viral symptoms after treatment compared to a control plant that did not receive the treatment. As used herein, a "treatment" includes any composition or formulation of the present technology.

As used herein, "suppressing" plant infection includes stopping or reducing the progression of viral infection or stopping or reducing the development of viral symptoms in a plant. Suppressing plant infection can be found by observing no increase in virus or viral symptoms in a plant after receiving the treatment compared to before receiving the treatment. Suppressing plant infection can also be found by observing less or no increase in viral particles or viral symptoms after receiving the treatment compared to a control plant that does not receive the treatment.

Concentration of Treatment

In some embodiments, the compositions disclosed herein may be administered by root drench at a concentration of about 0.5-0.6, 0.6-0.7, 0.7-0.8, 0.8-0.9, 0.9-1.0, 1.0-1.2, 1.2-1.4, 1.4-1.6, 1.6-1.8, 1.8-2.0, 2.0-4.0, 4.0-6.0, 6.0-8.0, 8.0-10.0, or 10.0-13.0 grams of the composition in about 10 gallons of water, or approximately half teaspoon in about 10 gallons (or 1.5 grams in ten gallons) of water.

In some embodiments, the compositions disclosed herein may be administered by foliar administration at a concentration of about 0.1-0.2, 0.2-0.3, 0.3-0.4, 0.4-0.5, 0.5-0.6, 0.6-0.8, 0.8-1.0, 1.0-1.2, 1.2-1.4, 1.4-1.6, or 1.6-1.8 grams of the composition in about 1 gallons of water, or approximately half teaspoon in about one gallon (or 1.3 grams per gallon).

Dosage, frequency and application techniques can vary depending on plant health, type of virus being treated, type of plant being treated, pathogens involved, temperature, weather and if treating at night or during daylight hours.

Treatment

Treatment Method with Healthy Plants

The present treatment is to maximally activate a superior SAR response with the formulation and methodology disclosed herein.

In some embodiments, healthy, non-infected plants are treated, activating a superior SAR response to produce healthier, more robust, disease resistant plants and increase yields. This is known in agricultural science as Defense Priming. In this case, a composition of the present technology can be used as a single foliar application, as an immune booster, plant stimulant and yield enhancer. The effect can be enhanced when also used as a root drench, as specified in the methodology. This forms part of the Defense Priming strategy, but with the superior SAR activation of the disclosed formulation and methodology.

Defense Priming is an agricultural strategy used to prepare a plant to complete its life cycle in the field, by activating its immune system, and preparing it for resistance to pathogens and climate stress. Because of the superior SAR activation of the three Salicylate Molecules working together, plants can be put in an enhanced state of Defense Priming. This is achieved via the superior SAR activation of the disclosed formulation and methodology. It allows for rapid and maximal SAR activation, which primes the plants immune system, making it resistant to plant pathogens and infections including Viral, Bacterial, Fungal, and Pest, and to Climate stress. This stimulates maximum plant health, vigor and genetic potential. Increase in yield and harvest quality are the ultimate results.

In some embodiments, the Defense Priming is done at an early stage, or vegetation stage of plant growth, before field planting or once established in the field. In other embodiments, the Defense Priming is done at any stage of plant growth, even during or after a flower or fruiting stage. By Defense Priming a plant, it has a maximal SAR response activated, and is in a state of immune system activation, even though an infection has not been detected. This causes a faster and more robust defense response upon an initial challenge by a virus or other pathogen. The superior SAR activation via the use of this composition and method of application of three Salicylate molecules and methodology, gives an enhanced defense capacity of the whole plant to many pathogens and climate stress. This allows for the use of the Defense Priming strategy in agriculture with the use of this formulation and methodology.

According to one embodiment, one foliar treatment can be sufficient to activate SAR. This can be combined with one drench application. Continued treatments over the life cycle of the plant can be done in cases of long-life cycle, disease pressure, climate effects or high value crops. However, because of the superior SAR activation achieved via the combination of at least three Salicylate molecules, only one foliar application may be necessary to fully activate SAR for the life of the plant and allow for the defense priming strategy to be implemented.

Examples of Treatment for Defense Priming:

Treatment may be effective from only one foliar application if plants are healthy. The foliar dosage can be reduced to one gram per gallon if desired. Better results may be seen if a root drench is also applied, which can be done at the same time as foliar application or separately. In some aspects, the foliar application and the root drench are performed one at a time. The Composition may be administered as a root drench and as a foliar dose using any of the dosage concentrations described in this technology.

Applications should begin once plants are rooted and growing vegetatively. Repeat applications as necessary, using the schedule for infected plants as a guide. The best results are from treating young plants that are growing vegetatively. By repeating treatment, superior SAR is maintained for the life of the plant. In situations of high disease pressure, extremes of climate or high crop value, repeated treatments maintain the highest activation of SAR, and produce the best results. Repeat applications at times of peak hormonal activity, such as transition into a flowering or fruiting stage are prescribed, and are part of the methodology in some embodiments.

Treatment to Suppress Plant Viruses

One objective of the present technology is the ability to suppress plant viruses with the disclosed formulation and methodology, in order to provide a successful harvest from what might otherwise be a diminished harvest or total loss if left untreated. A user can effectively suppress a plant virus if treatment is begun early enough in the plant's life cycle. Virus suppression can be so highly effective that the plants outwardly look normal and yield normally, even though they are infected with a virus. This is achieved by following a specific treatment methodology, of composition, dosage and frequency.

By repeatedly reactivating the maximal SAR response, using the disclosed formulation, following a prescribed dosage and precise frequency of reapplication, plant virus can be suppressed. The disclosed treatment also enables a virus infected plant to return to an outwardly normal appearance, and yield close to or as normal. When the process is begun early enough in the plant's life cycle, near total viral suppression is possible. When the methodology of repeat applications in vegetative growth, and again, repeat applications just after hormonal shift into flowering or fruiting are followed, viral suppression is maximized and sustained. In embodiments when the plant is treated by drench and/or foliar treatment in its final fruiting stage, at a point just before fruit ripening and finishing, the viral suppressing effects may be maintained until harvest. When the process is also combined with a soil or growing medium, pre-planting treatment, viral suppression is enhanced. Similarly, as the plant begins to shed necrotic deformed leaves as part of the programmed cell death (PCD) response, and these highly infected leaves are removed, as new healthy growth emerges, viral suppression is maximized. In preferred embodiments, a composition of the present technology is applied to a plant in the vegetative growth phase, before the flowering phase. In embodiments, a composition of the present technology is applied to a plant in the vegetative growth phase, before the flowering phase, and reapplied during the flowering phase.

Disclosed below is an example of a method of treating virus positive Cannabis plants and returning them to an outwardly normal state that allows for normal flowering. It is evident from the results of years of testing methods, formulations and doses that the method of treating plants is just as important for positive outcomes as the composition itself. Vegetation stage is described as beyond seedling to a point just before budding, flowering and fruit formation. Flower stage begins when node stacking begins forming buds, flowers, and then fruit.

Treatment for Severe Viruses in Cannabis, for Example, Tobacco Mosaic Virus (TMV)

In some embodiments, a chosen composition is applied as a foliar and drench twice per week for two consecutive weeks in the early vegetative growth period. Subsequently, the composition may be applied as a foliar and drench twice per week for two consecutive weeks at the beginning of the flowering period. In some embodiments, the composition may be applied when the plant undergoes a rapid hormonal change at the beginning of the vegetative growth period and/or flowering period. The composition may be applied as a final drench application in week 5 of the flowering period.

New Treatment for Milder Virus in Cannabis—for Example Hop Latent Viroid (HLV) Year 2020

In some embodiments, a chosen composition is applied as a foliar and drench once per week for two consecutive weeks in the early vegetative growth period. Subsequently, the composition may be applied as a foliar and drench once per week for two consecutive weeks at the beginning of the flowering period. In some embodiments, the composition may be applied when the plant undergoes a rapid hormonal change at the beginning of the vegetative growth period and/or flowering period. The composition may be applied as a final drench application in week 5 of the flowering period.

Soil and Growing Medium Pre-Planting Treatment

As part of the methodology of this disclosure, viral suppression and superior SAR activation for Defense priming can be enhanced by placing between a quarter gram to a gram or more of the composition in the planting hole of the plant if in soil. In some embodiments, the composition is applied in the form of a pellet. If growing in an artificial medium, the medium itself may be treated prior to planting. This strategy is particularly effective with virus positive plants. But is useful in defense priming of high value crops.

Treating Virus Positive Plants

In situations where high value, virus positive crops are treated there is often a high level of human maintenance taking place. In some embodiments, in the first few weeks after the initial, early lifecycle treatment, necrotic and deformed leaves are removed once new healthy growth appears. The maximal levels of SAR activated in the plant, force the plant into a state of apoptosis—the programmed cell death (PCD) of virus infected leaves. These necrotic, deformed leaves contain high levels of virus particles and should be gradually removed, as new healthy growth appears. The plant is essentially shedding the viral infection in these leaves. This should be done in a gradual, systematic manner, usually from the bottom of the plant upwards, as new healthy growth appears on the growth tips of the plant. In this way, the user assists the plant to help suppress the plant virus. This technique constitutes part of the methodology of this disclosure.

Removed viral infected plant material should ideally be burned. Hands and tools used in this process are highly contaminated vectors for future viral infections. Stringent decontamination and control measures must be taken when working with virus positive, infected plants.

Use on All Plants

The scope of this disclosure is for treatment of all plants, agricultural, ornamental, and wild. Similar treatment ranges work on all plants. Treatment is advised on those that are prone to virus infection. There are going to be many formulations, dosage and frequency of application ranges for every different possible virus infected or potentially infected, agricultural or ornamental crop. This treatment methodology has been specifically tested for Cannabis plants with specific, known viruses. Using this formulation and methodology, a superior SAR activation can be achieved for the Defense Priming strategy in any plant. Likewise, viral suppression can be achieved in any plant.

Use on Mother Plants

This formulation and methodology has been successfully used to treat healthy, virus negative mother plants in cloning operations, to maintain optimum plant health and increase rooting rates of clones taken from treated mother plants. The increase in rooting rates induced in clones taken from treated mother plants is due to the superior SAR activation of this formulation and methodology. As used herein, an increase in "rooting rates" refers to an increase in the likelihood that a clone from a mother plant will produce roots independently of the mother plant.

In cases where virus positive mother stock must be cloned to maintain genetic stock, use of this formulation and methodology, allows for near total virus suppression in both mother plants and clones. Virus suppression can be so effective that all outward, visible symptoms of plant virus disappear as the plant grows new healthy tissue. With repeat treatment, following the methodology, yields in virus positive clones can be expected to be close to normal, even though the plant still has a virus. The superior SAR response activated by this formulation and methodology effectively suppresses plant viruses, and increases rooting rates in clones taken from treated mother stock.

Use for Creating Virus-Free and Viroid-Free Plant Stock

The mass availability of virus free plant material is of critical importance to world Agriculture. Another usage of the present technology may be to assist in the process of creating virus free plant stock from virus infected plants. The current process of creating virus free plant stock involves techniques including but not limited to—micro-shoot tip culture, meristem culture, embryogenic culture, micrografting, and tissue culture.

These techniques are limited in their success because the resulting plants must be retested to ascertain if the procedure was successful in making a clone that is virus free. The present technology includes methods of increasing the success rate of creating virus free plant stock by using micro-shoot tip culture, meristem culture, embryogenic culture, micrografting, and/or tissue culture by applying the composition or formulation of the present technology according to the methods of the present technology. Using a composition, formulation, or method of this technology, viral load in infected genetic mother stock can be reduced such that the chance of taking a virus free cutting using the known methods increases. These efforts are exemplified in the USA by the National Clean Plant Network via the USDA, that provides virus free plant motherstock to nurseries nationwide. The formulation and methodology disclosed herein, can increase the success rate of these strategically critical efforts, which are vital to food security.

The formulation and methodology may also be used to maintain the robust health and virus free status of mother stock produced via these efforts that are distributed and massively propagated at central nurseries.

Further—because the composition, formulation, and method of the present technology increases rooting rates of clones/cuttings taken from mother stock, it may assist in the success of mass propagation efforts.

Further Use of Formulation

Further uses are as a below soil surface application, done prior to planting. In this usage the formulation may be placed below the plant in the soil or growing medium as a solution, a powder, or in a pelletized form—allowing for SAR activation to occur via the root zone. This pre-planting strategy has been very effective in activating SAR by itself, or in conjunction with later foliar and drench applications, particularly when used with high value crops. This method of application is also very applicable to planting of virus positive plants, unknown viral status plants, or plants that may be at risk of viral exposure.

In some embodiments, a single "pellet" of the formulation may have a dose of about 0.1 g (grams) to 0.2 g, 0.2 g to 0.3 g, 0.3 g to 0.4 g, 0.4 g to 0.5 g, 0.5 g to 0.6 g, 0.6 g to 0.7 g, 0.8 g to 0.9 g, or 0.9 g to 1 g of the formulation. In some embodiments, multiple pellets are delivered to the soil or growing medium, having a total dose of about 0.1 g (grams) to 0.2 g, 0.2 g to 0.3 g, 0.3 g to 0.4 g, 0.4 g to 0.5 g, 0.5 g to 0.6 g, 0.6 g to 0.7 g, 0.8 g to 0.9 g, or 0.9 g to 1 g of the formulation. In some embodiments, the formulation may have a dose of about 0.33 g to 1 g of the formulation. In some embodiments, three 0.33 g pellets are delivered to the soil for a total dose of about 1 g of the formulation.

In embodiments where a larger plant is treated with the formulation (e.g. larger fruit trees), the dose may be larger. In some embodiments, the dose may be 0.5 g to 1 g, 1 g to 1.5 g, or 1.5 g to 2.0 g of the formulation. In some embodiments, the dose may be about 2 g of the formulation. In some embodiments, six 0.33 g pellets are delivered to the soil for a total dose of about 2 g of the formulation.

In some embodiments, powder may be placed in the planting hole at the same range of dosage as described for the pellet formulation. Soil or growing mediums can be treated with this preplanting strategy in such a way to achieve these plant site specific dosage ranges. An example would be to pre-treat a large coco fibre bed in an indoor growing environment, prior to planting, using installed irrigation sprayers to achieve approximately 0.3 to 1 gram of the formulation (in dilution) to each plant site, before planting. Large soil areas, for example in greenhouse rows, can be pretreated in this same way, via irrigation equipment, to achieve the dosage ranges specified and desired. Similarly, "rockwool" cubes can have a pellet inserted bellow the plant when transplanting up a "rockwool" size. Because of the manual nature of transplanting plants, this method of inserting a pellet or powder into the planting hole is quite easy to achieve and highly recommended for effectivity of inducing a long term, sustained SAR response.

Epigenetics

Because of the epigenetic transference of SAR activation, and the superior SAR activation achieved via this combination of Salicylates and methodology, the SAR activation can be passed down to future generations via clones and seed, offering enhanced resistance to disease, increased robustness, increased yields, and increased quality to future generations. This transference of SAR is a beneficial side effect of treatment with this unique formulation and methodology. It can be further enhanced by continued re-treatment of subsequent generations of plants with this formulation and methodology. Because of the superior SAR activation of this formulation and methodology, epigenetic transference of SAR is enhanced.

There is also epigenetic transference for "primed to be primed" whereby the capacity for priming can be enhanced and passed on by priming. Plants, once primed, pass on the capacity for even stronger priming than the offspring of unprimed controls. This has been observed even in cloned plants from a mother plant treated with this superior formulation and methodology. In some embodiments, it is provided that the superior SAR activation achieved with this formulation and methodology can induce the "primed to be primed" response both in seed and clone. This allows for an even more enhanced SAR activation, in genetic progeny, seed and clone.

This also allows the farmer to use the Defense Priming strategy with greater effect, as plant life cycles continue over the course of repeated plantings, and repeated treatments with this formulation and methodology. This gives an improved, multigenerational resistance to many diseases, pests and climate effects. The effect is the transference of robustness, vigor and optimization of genetic potential, improving yields and quality with repeat treatments following the formulation and methodology.

Increase in Yields and Quality of Plants and Subsequent Generations of Plants

In some embodiments, the methods of the present technology promote increased yields of a plant treated with a composition of the present technology. As used herein, "yields" includes the increase in any part of the plant, including but not limited to plant roots, stems, leaves, flowers, fruits, and seeds. Increased flower yield includes an increase of the flowers of the plant.

Increasing yield of a plant may include observing a greater amount of a part of the plant compared to before the plant was treated with the composition. In some embodiments, increasing yield of a plant may include observing a greater amount of a part of the plant compared to an untreated control.

In some embodiments, the methods of the present technology promote increased quality of a plant treated with a composition of the present technology. As used herein, increased "quality" includes an increase in any trait that is known by one of skill in the art to be superior to another trait in a plant. For example, increased quality includes increased visual appearance of a plant. In some aspects, increasing the quality may be observed as fewer abnormal markings on the plant, for example fewer spots, bruises, blemishes, cuts, holes, or discolorations compared to before the plant was treated or compared to an untreated control plant. In some aspects, increasing the quality may be observed as an increase in any visual trait that is regarded by one of skill in the art as a healthy visual trait, for example, well-formed flowers, leaves, fruit, stems, or root systems and a healthy color. In some embodiments, increased quality can include improved taste, smell, desirable oils, resins, terpenes, alkaloids, or sugar content.

Due to epigenetic transference of SAR and the "primed to be primed" response, the methods of the present technology may increase yields in subsequent generations.

Increasing yield in a subsequent generation may include observing a greater amount of a part of the plant in the subsequent generation of the plant compared to the parent generation of the plant. Increased yield in a subsequent generation may also include observing a greater amount of a part of the plant is the subsequent generation of the plant compared to a subsequent generation from a plant that was not treated according to the present technology. In some aspects, the present technology increases the likelihood of a plant to produce a virus-free seed.

In some embodiments, the methods of the present technology promote increased quality of subsequent generations of plants. In some aspects, increasing the quality may be observed as fewer abnormal markings on the plant, for example fewer spots, bruises, blemishes, cuts, holes, or discolorations compared to the parent generation of the plant or compared to a subsequent generation of an untreated plant. In some aspects, increasing the quality may be observed as an increase in any visual trait that is regarded by one of skill in the art as a healthy visual trait, for example, well-formed flowers, leaves, fruit, stems, or root systems and a healthy color. In some embodiments, increased quality of a second generation can include improved taste, smell, desirable oils, resins, terpenes, alkaloids, or sugar content of the second generation.

In some embodiments, plants treated according to the present technology may show an increase in yield or flower yield of the plant by 8%, 10%, 15%, 20%, 25%, or 30% or more compared to an untreated plant. In some embodiments, plants treated with multiple applications according to the present technology may show an increase in yield or flower yield of the plant by 8%, 10%, 15%, 20%, 25%, or 30% or more compared to an untreated plant. In some embodiments, plants treated with multiple applications according to the present technology may show an increase in yield or flower yield of the plant by 8%, 10%, 15%, 20%, 25%, or 30% or more compared to a plant that is only treated one time.

High Intensity Agriculture Method to Maintain Maximum SAR Response at all Times.

In highly intensive agricultural settings, particularly greenhouses and indoor, it is often desirable to maintain the highest possible levels of SAR response at all times. This can also be thought of as maintaining the highest possible state of defense priming. After the initial SAR defense priming response is initiated as described herein, the plants can be maintained in the highest possible state of SAR activation and therefore Defense Priming by following a schedule of weekly foliar application at a low dosage. The dosage can be applied in any range described herein. For example, the dosage of the composition may be 0.1 g to 1 g per gallon. In embodiments, where the plant is a cannabis plant, the composition may be applied at a concentration of 0.25 g up to 0.5 g per gallon. The composition may be applied by foliar application every week. The composition may be applied at night. The composition may be applied using a standard spreading agent such as yucca extract when foliar spraying. The composition of the present technology may be sprayed as part of a mixture with other agricultural ingredients, fungicides, pesticides, plant oils, or sulfur.

In some embodiments, after the initial SAR Defence Priming response is initiated as described herein, irrigation/drench application can be done at a low level every watering—daily or weekly or at every watering to maintain the highest possible SAR activation in the plants. The composition may be applied by irrigation/drench application using any concentration described herein. For example, the composition may be applied at a concentration of 0.05 to 0.66 grams per 10 gallons of irrigation water. In some embodiments, the plant is a cannabis plant and the composition may be applied at a concentration of 0.2-0.33 grams per 10 gallons of irrigation water, once per week, or daily, or at every watering/irrigation for Cannabis. In some such embodiments, the composition may be applied with any fertilizer or additive known to one of skill in the art.

The two methods of maintaining SAR response described above may be combined—both foliar and drench/irrigation—or done separately (as just a weekly foliar, or just drenching/irrigating) or alternately (rotating between drench and foliar)—depending on plant response, and conditions.

The Dangers of Viral Suppression "Masking" a Plant Virus

There are dangers of "masking" virus infected plants. Plants treated with the disclosed formulation have robust and apparently virus free appearance. However, this is only suppression not a cure. If these outwardly healthy plants are chosen for breeding or cloning purposes they will pass virus to future generations—sometimes even in seed. However, it has been that sometimes certain genetic material must be kept alive for future crops, even if virus infected. In these cases, the maintenance of superior SAR activation through continued treatment allow for cloning and breeding to take place in an otherwise normal manner, because the plant virus is effectively suppressed. If treatment is maintained, virus infected plants can be continuously cloned or bred for many generations and flowered or fruited as normal, with yields close to or as normal, maintaining healthy outward appearance and characteristics, as long as treatment is maintained. Although this runs counter to longstanding and logical virus eradication procedures in Agriculture, unforeseen circumstances may require this approach. The demands of food production validate viral suppression in Agriculture, particularly in extreme circumstances of crop failure and resultant starvation.

"Masking" can have other dangers. Workers and Farmers may forget that the crop they are growing is infected with a plant virus—because it appears robust and healthy. This can lead to poor cultural practices that unintentionally spread plant virus via vectors or sap contact on tools or hands from infected plant stock to un-infected plant stock. To avoid spread of plant viruses, strict control measures must be practiced when growing any virus positive plants to full term.

Methods presented herein are to activate a superior SAR response in plants. As part of a Defense Priming strategy, this can improve crop yields which can help to increase world food production. SAR primed plants reduce the need for highly toxic pesticides and fungicides. Salicylates as a class of molecules are very biocompatible, and occur naturally in many plants. Although they are toxic in high doses, in low doses, such as in the miniscule residual amounts on treated food crops, they may actually be beneficial to human health. As we must massively increase world food production, while simultaneously fighting increased disease pressure, Defense Priming by activating SAR as described, is a cost effective and necessary agricultural methodology.

There is currently a large increase in plant virus disease pressure on world agriculture. The methods presented herein are to effectively suppress plant viruses. Without viral suppression, diminished or total crop failure is often the result. Economic loss or starvation are the realities faced by farming communities, and those that depend on food production. Plant virus suppression allows for a successful harvest, regardless of infection. It is a paramount need in the tool kit of every farmer in the world.

While described in connection with specific embodiments thereof, it will be understood that the principles described herein is capable of further modifications and this application is intended to cover any variations, uses, or adaptations following, in general, the principles disclosed herein and including such departures from the present disclosure as come within known or customary practice within the art to which the technology pertains and as may be applied to the essential features hereinbefore set forth and as follows in the scope of the appended claims.

Example 1: Applying the Composition of the Present Technology Reduces Detectable Virus and Increases Plant Yields and Growth Rate Cannabis plants infected with hop latent viroid (HLv) were treated with formulations of the present technology to show its effect on reducing HLv symptoms.

Because the virus is a "latent viroid," symptoms of the virus may not be expressed during the trial. For this reason, the trial included a "stress test" at a certain points in the growth cycle. The stress test included water deprivation, which induced expression of viral symptoms.

All plant groups were given the stress test and then subsequently treated with or without the formulation, and the plants were measured to determine whether they produced higher yields, higher quality, fewer viral symptoms, or lower/undetectable viral load. Before and after testing, plants were tested to determine whether they were positive for HLv.

Initially four strains of plants were tested to determine if they were positive for HLv—Gary Payton (GP), Black Cherry Gelato (BCG), Sherb, and ROR. BCG and ROR strains tested positive for HLv and GP and Sherb tested negative for HLv. Virus testing was performed by AL&L crop solutions (Vacaville, CA), and a positive test was measured as a Cq value of greater than 30. A negative test was measured as no detectable virus.

48 HLv-positive BCG plants were transplanted into 4 inch pots with "Happy Frog" dirt and shifted from 24 hour light to 20 hour light maintained with low output LED light (day 0). Plants were watered with plain water. The plants were about 5.5 inches tall from base to top node, and showed leaf "mottle"—a possible viral symptom. 12 days later (day 12), plants showed additional symptoms of virus including curling leaf tips and holes in the leaves.

Next, the 48 plants were randomized into one of three treatment groups:

Group 1-16 plants receiving full treatment (treatments on days 12, 18, 22, and 30 and a drench treatment on day 58)

Group 2-16 plants receiving partial treatment (one treatment on day 12)

Group 3-16 plants receiving no treatment (control group)

On day 12, groups 1 and 2 were treated with foliar treatment and root drench. 1% teaspoon (about 1.3-1.6 grams) of a formulation of 98.9% ASA, 1% SA, and 0.1% MeSA was added to a gallon of water for foliar treatment. % teaspoon of the formulation was added to 10 gallons of water for the root drench. All plants were transplanted into 3 gallon pots, shifted from 24 hour light to 20 hour light (light maintained with low output LED), and watered with plain waterthree days later (day 15). During transplantation, weak roots and stems were observed in all groups—symptoms of the virus.

On day 18, group 1 alone was treated with a second foliar treatment and root drench, using the same formulation and method as the day 12 treatment.

On day 22, all groups were "topped" by removing the top node, encouraging wider growth, and flowering was induced by turning off artificial light. All plants were watered, and group 1 was given a third treatment. All groups were sprayed with sulfur to repel mites. On day 22, the groups were measured. A representative plant from the full treatment group had a plant height of approximately 20 inches. A representative plant from the partial treatment group had a plant height of approximately 19.5 inches. A representative plant from the no treatment group had a plant height of approximately 17 inches.

On day 30, all groups were treated with sulfur again. Group 1 was treated with a fourth foliar treatment and root drench.

On day 36, plant height was measured again. A representative plant from the treated group had a plant height of approximately 24 inches. A representative plant from the partial treatment group had a plant height of approximately 22 inches. A representative plant from the no treatment group had a plant height of approximately 22.5 inches.

On day 41, the no treatment group showed further viral symptoms of virus, including weak structure, stunted growth, pale color, and failure to thrive. The partial treatment group grew well, but had some pale color. The full treatment group had some plants with weak growth, but all plants had better coloration than the partial treatment or no treatment groups. Node sites in the full treatment group were also closer together.

On days 43 and 47, all treatment groups were watered with a fertilizer (900 ppm 4-16-16 fertilizer at a pH of approximately 6.3).

On day 49 (week 3 of flowering), a representative plant from the no treatment group had a height of approximately 22 inches and showed some symptoms of infection. a representative plant from the partial treatment group had an approximate height of 25 inches with good flower formation and a paler color than the full treatment group. a representative plant from the full treatment group had a height of approximately 28 inches, and while there were a few sick-appearing plants, all other plants were healthy. The full treatment group had a faster growth rate than the partial treatment group and the no treatment group.

On day 58, the treatment group received a drench-only treatment. All plants were given fertilization of 1000 ppm with 4-16-16 fertilizer.

On day 63, leaves from all groups were taken and submitted for lab testing to determine if the plants tested positive for HLv. The full treatment and the partial treatment groups tested negative and the no treatment group tested positive.

On day 73, the full treatment group had full smell and a tight bud structure. The partial treatment group had good smell and full bud structure. The no treatment group had weak smell and looser bud structure.

On day 86 (harvest day), the full treatment group had a full smell and very tight bud structure, the partial treatment group had a decent smell and full bud structure, and the no treatment group had undeveloped smell and full but loose bud structure.

On day 92, the plants finished drying and each group of 16 plants were pooled and processed to determine weight and yield of the plants. As shown in FIG. 1, the full treatment group produced 622 g of product, the partial treatment group produced 489 g of product, and the no treatment group produced 445.5 g of product. In other words, the full treatment group showed a 39.61% increase in yield compared to the no treatment group and a 27.19% increase in yield compared to the partial treatment group. The partial treatment group showed a 9.7% increase in yield compared to the no treatment group.

Conclusions. The full treatment group showed quicker growth rate and a much larger yield than the partial treatment group and the no treatment group, and the full treatment resulted in suppression of HLv to undetectable levels. Although the partial treatment group did not show as large of yield as the full treatment group, it also suppressed HLv to undetectable levels.

EXEMPLARY EMBODIMENTS

Clause 1. A method of preventing, treating, or suppressing plant infection comprising applying to a plant a composition comprising: (i) ASA and methyl salicylate (MeSA), (ii) acetyl salicylic acid (ASA) and salicylic acid (SA), or (iii) ASA and SA and MeSA, during vegetative growth period, prior to the flowering period.

Clause 2. The method of clause 1, further comprising applying the composition during the flowering period.

Clause 3. The method of clause 1, wherein the composition comprises about 80% to about 99% by weight of ASA.

Clause 4. The method of clause 1, wherein the composition comprises about 1% to about 10% by weight of SA.

Clause 5. The method of clause 1, wherein the composition comprises about 0.01% to about 2.0% by weight of MeSA.

Clause 6. The method of clause 1, wherein applying the composition comprises re-applying the composition, such that the composition remains on the plant for 5 to 12 days.

Clause 7. The method of clause 1, wherein the plant is treated by applying the composition as a foliar spray, as a root drench, a plant dip, or as a direct soil surface application.

Clause 8. The method of clause 7, wherein the plant is treated by root drenching by applying the composition at a concentration of about 0.5 to 13.0 grams in about 10 gallons of water.

Clause 9. The method of clause 7, wherein the plant is treated by foliar application of the composition by applying the composition at a concentration of about 0.1 to 1.8 grams per gallon of water.

Clause 10. The method of clause 7, wherein the plant is treated by plant dip application of the composition by applying the composition at a concentration of about 0.1 to 1.8 grams per gallon of water.

Clause 11. The method of clause 7, wherein the plant is treated by direct soil or growing medium application, wherein 0.1 to 2 grams of the composition is added to the soil in powder form, pellet form, or liquid solution.

Clause 12. The method of clause 11, wherein the soil or growing medium is treated before the plant is planted.

Clause 13. The method of clause 1, wherein the plant has a virus or a viral symptom before the composition is applied.

Clause 14. The method of clause 13, wherein the composition is re-applied at least three times during the vegetative growth period.

Clause 15. The method of clause 13, wherein applying the composition results in (i) elimination of viral infection or symptoms of the viral infection in the plant compared to before applying the composition, (ii) reduced viral infection or symptoms of the viral infection in the plant compared to before applying the composition, (iii) stopping the development of the viral infection or symptoms of the viral infection compared to a control plant, or (iv) reducing the development of the viral infection or symptoms of the viral infection compared to a control plant.

Clause 16. The method of clause 13, further comprising removing necrotic or virus-infected plant matter after the composition is applied and new healthy growth is occurring at the growth tips.

Clause 17. The method of clause 11, wherein necrotic or virus-infected plant matter is removed between 3 days and 4 weeks after the composition is applied.

Clause 18. The method of clause 1, wherein the plant does not have a virus or does not have a viral symptom before the composition is applied.

Clause 19. The method of clause 13, wherein applying the composition results in (i) preventing the development of the viral infection or symptoms of the viral infection compared to a control plant, or (ii) preventing the development of the viral infection or symptoms of the viral infection compared to a control plant.

Clause 20. The method of clause 1, wherein the composition comprises about 80% to about 99% by weight of ASA, about 1% to about 10% by weight of SA, and about 0.01% to about 2.0% by weight of MeSA.

Clause 21. A method of generating a virus-resistant or virus-free clone from a plant comprising: (a) treating the plant according to the method of clause 1, and (b) creating the virus-resistant or virus-free clone from the plant by microshoot tip culture, meristem culture, embryogenic culture, micrografting, and/or tissue culture.

Clause 22. A method of activating Systemic Acquired Resistance (SAR) in a plant, comprising applying a composition comprising: Acetyl Salicylic Acid (ASA), Salicylic Acid (SA), and/or Methyl Salicylate (MeSA), below the plant in the soil, or in a growing medium as a solution, a powder, or in a pelletized form, thereby allowing for SAR activation to occur via the root zone.

Clause 23. The method of clause 22, wherein the composition comprises ASA, SA, and MeSA.

Clause 24. The method of clause 22 further comprising applying the composition in conjunction with later foliar and drench applications.

Clause 25. A composition comprising acetyl salicylic acid (ASA), salicylic acid (SA), and methyl salicylate (MeSA), wherein the composition comprises about 80% to about 99% by weight of acetyl salicylic acid (ASA), about 1% to about 10% by weight of salicylic acid (SA), and about 0.01% to about 2.0% by weight of methyl salicylate (MeSA).

Clause 26. The composition of clause 25, wherein the ASA, SA, and MeSA are obtained from organic source selected from the group consisting of Willow, Myrtle, Meadowsweet, Licorice and Wintergreen.

Clause 27. The composition of any one of clauses 25-26, wherein the ASA, SA, and MeSA are in extracted, concentrated, purified or synthesized form or in any combination thereof.

Clause 28. The composition of any one of clauses 25-27, wherein the composition or formulation further comprising Silica or Silicon as an additive.

Clause 29. The composition of clause 28, wherein the additive is in the form of Orthosilicic acid, Monosilicic acid, Potassium Silicate, or another Silicate or Silicon molecule.

Clause 30. The composition of any one of clauses 25-29, wherein the composition or formulation further comprising molecules that induce priming responses is selected from the group consisting of β-Aminobutyric acid (BABA), Jasmonic Acid, Azelaic Acid, Pipecolic Acid and other Salicylate molecules.

Clause 31. The composition of any one of clauses 25-30, wherein the composition or formulation comprises about 80% to about 99% ASA by weight.

Clause 32. The composition of any one of clauses 25-31, wherein the composition or formulation comprises about 1% to about 10% SA by weight.

Clause 33. The composition of any one of clauses 25-31, wherein the composition or formulation comprises about 0.01% to about 2% MeSA. by weight.

Clause 34. The method of any one of clauses 1-23 or the composition of any one of clauses 25 to 31, wherein the plant is a cannabis plant.

Clause 35. A method of increasing yields of a plant comprising applying to a plant a composition comprising: (i) ASA and methyl salicylate (MeSA), (ii) acetyl salicylic acid (ASA) and salicylic acid (SA), or (iii) ASA and SA and MeSA, during vegetative growth period, prior to the flowering period.

Clause 36. The method of clause 35, wherein the composition is applied once as a root drench and once as a foliar spray prior to flowering.

Clause 37. The method of clause 36, wherein the composition is re-applied at least two times during the vegetative growth period.

Clause 38. The method of clause 36, wherein the plant increases yields by 8% or more compared to a plant that does not receive an application of the composition.

Clause 39. The method of clause 37, wherein the plant increases yields by 30% or more or more compared to an infected plant that does not receive an application of the composition.

Clause 40. The method of clause 39, wherein the plant increases yields by 20% or more compared to an infected plant that receives only one application of the composition.

Clause 41. A method of increasing the likelihood of creating a virus free seed comprising applying to a plant a composition comprising: (i) ASA and methyl salicylate (MeSA), (ii) acetyl salicylic acid (ASA) and salicylic acid (SA), or (iii) ASA and SA and MeSA, during vegetative growth period, prior to the flowering period.

Clause 42. The method of clause 1, wherein the composition is applied to the plant daily or weekly.

Clause 43. The method of clause 42, wherein the composition is applied to the plant daily.

Clause 44. The method of clause 42, wherein the composition is applied to the plant weekly.

Clause 45. The method of any one of clauses 42-44, wherein the composition is applied at night.

Clause 46. A method of increasing rooting rates of a clone taken from a mother plant comprising applying to the mother plant a composition comprising: (i) ASA and methyl salicylate (MeSA), (ii) acetyl salicylic acid (ASA) and salicylic acid (SA), or (iii) ASA and SA and MeSA, during vegetative growth period, prior to the flowering period.

Clause 47. A method of defense priming a plant comprising applying to the mother plant a composition comprising: (i) ASA and methyl salicylate (MeSA), (ii) acetyl salicylic acid (ASA) and salicylic acid (SA), or (iii) ASA and SA and MeSA, during vegetative growth period, prior to the flowering period.

I claim:

1. A method of preventing, treating, or suppressing plant viral infection comprising applying to a plant a composition comprising: (i) ASA and methyl salicylate (MeSA), (ii) acetyl salicylic acid (ASA) and salicylic acid (SA), or (iii) ASA and SA and MeSA, during vegetative growth period, prior to the flowering period, wherein the composition comprises about 80% to about 99% by weight of ASA.

2. The method of claim 1, wherein the composition is re-applied during the flowering period.

3. The method of claim 1, further comprising cloning the plant after applying the composition, wherein a cloned plant is virus resistant.

4. The method of claim 1, wherein the composition comprises about 1% to about 10% by weight of SA.

5. The method of claim 1, wherein the composition comprises about 0.01% to about 2.0% by weight of MeSA.

6. The method of claim 1, wherein applying the composition comprises re-applying the composition, such that the composition remains on the plant for 5 to 12 days.

7. The method of claim 1, comprising applying the composition as a foliar spray, as a root drench, a plant dip, or as a direct soil surface application.

8. The method of claim 7, wherein the plant is treated by root drenching by applying the composition at a concentration of about 0.5 to 13.0 grams of ASA and at least one of MeSA and SA in about 10 gallons of water.

9. The method of claim 7, wherein the plant is treated by foliar application of the composition by applying the composition at a concentration of about 0.1 to 1.8 grams of ASA and at least one of MeSA and SA per gallon of water.

10. The method of claim 7, wherein the plant is treated by plant dip application of the composition by applying the composition at a concentration of about 0.1 to 1.8 grams of ASA and at least one of MeSA and SA per gallon of water.

11. The method of claim 7, wherein the plant is treated by direct soil or growing medium application, wherein 0.1 to 2 grams of ASA and at least one of MeSA and SA is added to the soil in powder form, pellet form, or liquid solution.

12. The method of claim 11, wherein the soil or growing medium is treated before the plant is planted.

13. The method of claim 1, wherein the plant has a virus or a viral symptom before the composition is applied.

14. The method of claim 13, wherein the composition is re-applied at least three times during the vegetative growth period.

15. The method of claim 13, wherein applying the composition results in (i) elimination of viral infection or symptoms of the viral infection in the plant compared to before applying the composition, (ii) reduced viral infection or symptoms of the viral infection in the plant compared to before applying the composition, (iii) stopping the development of the viral infection or symptoms of the viral infection compared to a control plant, or (iv) reducing the development of the viral infection or symptoms of the viral infection compared to a control plant.

16. The method of claim 13, further comprising removing necrotic or virus-infected plant matter after the composition is applied and new healthy growth is occurring at the growth tips.

17. The method of claim 11, wherein necrotic or virus-infected plant matter is removed between 3 days and 4 weeks after the composition is applied.

18. The method of claim 1, wherein the plant does not have a virus or does not have a viral symptom before the composition is applied.

19. The method of claim 18, wherein applying the composition results in preventing the development of the viral infection or symptoms of the viral infection compared to a control plant.

20. The method of claim 1, wherein the composition comprises about 1% to about 10% by weight of SA, and about 0.01% to about 2.0% by weight of MeSA.

* * * * *